US011487768B2

(12) United States Patent
Hasegawa et al.

(10) Patent No.: US 11,487,768 B2
(45) Date of Patent: Nov. 1, 2022

(54) GENERATING SEARCH RESULTS UTILIZING ACCESS CONTROL

(71) Applicant: International Business Machines Corporation, Armonk, NY (US)

(72) Inventors: Tohru Hasegawa, Tokyo (JP); Takahito Tashiro, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/182,837

(22) Filed: Feb. 23, 2021

(65) Prior Publication Data

US 2022/0269683 A1    Aug. 25, 2022

(51) Int. Cl.
*G06F 16/2457*    (2019.01)
*G06F 21/62*    (2013.01)
*G06F 16/248*    (2019.01)

(52) U.S. Cl.
CPC ...... *G06F 16/24575* (2019.01); *G06F 16/248* (2019.01); *G06F 21/6218* (2013.01)

(58) Field of Classification Search
None
See application file for complete search history.

(56) References Cited

U.S. PATENT DOCUMENTS

| | | | |
|---|---|---|---|
| 8,417,693 B2 | 4/2013 | Lempel | |
| 9,338,493 B2 * | 5/2016 | Van Os | G10L 17/00 |
| 9,668,024 B2 * | 5/2017 | Os | G06F 16/7867 |
| 9,928,379 B1 * | 3/2018 | Hoffer | G16H 50/20 |
| 10,904,611 B2 * | 1/2021 | Van Os | H04N 21/4828 |
| 10,984,128 B1 * | 4/2021 | Hoffer | G16B 50/30 |
| 2013/0238589 A1 | 9/2013 | Yarramreddy | |
| 2014/0258267 A1 * | 9/2014 | Lin | G06F 16/5866 707/722 |
| 2015/0207798 A1 | 7/2015 | Nallapa Raju | |
| 2015/0312259 A1 | 10/2015 | Alpha | |
| 2018/0301222 A1 * | 10/2018 | Dew, Sr | G16H 15/00 |
| 2021/0209249 A1 * | 7/2021 | Hoffer | G06F 21/6245 |

* cited by examiner

*Primary Examiner* — Kim T Nguyen
(74) *Attorney, Agent, or Firm* — Daniel R. Simek; Alexander G. Jochym (57) ABSTRACT

Aspects of the present invention disclose a method, computer program product, and system for generating search results based on access control of a requesting user. The method includes one or more processors receiving a search query from a user. The method further includes generating a first candidate list of search results based on the received search query. The method further includes generating a second candidate list of search results based on the received search query. Generating the second candidate list of search results includes filtering out potential search results based on indexed access privilege data. The method further includes determining a subset of search result entries in the first candidate list by analyzing a defined number of search result entries in the first candidate list. Analyzing the defined number of search result entries includes attempting to access entries of the defined number utilizing access credentials of the user.

20 Claims, 4 Drawing Sheets

GENERATING SEARCH RESULTS UTILIZING ACCESS CONTROL

BACKGROUND OF THE INVENTION

The present invention relates generally to the field of searching, and more particularly to searching based on access privileges.

A search engine is a software system that is designed to carry out web searches (i.e., Internet searches), which means to search the World Wide Web in a systematic way for particular information specified in a textual web search query. The search results are generally presented in a line of results, often referred to as search engine results pages (SERPs). The information may be a mix of links to web pages, images, videos, infographics, articles, research papers, and other types of files. Some search engines also mine data available in databases or open directories.

Enterprise search is the practice of making content from multiple enterprise-type sources, such as databases and intranets, searchable to a defined audience. "Enterprise search" is used to describe the software of search information within an enterprise (though the search function and the results may still be public). Enterprise search can be contrasted with web search, which applies search technology to documents on the open web, and desktop search, which applies search technology to the content on a single computer. Enterprise search systems index data and documents from a variety of sources such as: file systems, intranets, document management systems, e-mail, and databases. Many enterprise search systems integrate structured and unstructured data in the corresponding collections. Enterprise search systems can also use access controls to enforce a security policy on their users. Enterprise search can be seen as a type of vertical search of an enterprise.

A vertical search engine is distinct from a general web search engine, in that a vertical search engine focuses on a specific segment of online content. They are also called specialty or topical search engines. The vertical content area may be based on topicality, media type, genre of content, etc. Common verticals include shopping, the automotive industry, legal information, medical information, scholarly literature, job search and travel. Examples of vertical search engines include the Library of Congress, genealogy services, real estate search services, etc.

SUMMARY

Aspects of the present invention disclose a method, computer program product, and system for generating search results based on access control of a requesting user. The method includes one or more processors receiving a search query from a user. The method further includes one or more processors generating a first candidate list of search results based on the received search query. The method further includes one or more processors generating a second candidate list of search results based on the received search query. Generating the second candidate list of search results includes filtering out potential search results based on indexed access privilege data indicating whether the user can access potential search results. The method further includes one or more processors determining a subset of search result entries in the first candidate list by analyzing a defined number of search result entries in the first candidate list. Analyzing the defined number of search result entries includes attempting to access respective search results entries of the defined number of search entries utilizing access credentials of the user.

In another embodiment, the method further includes one or more processors determining a subset of search result entries in the second candidate list by analyzing one or more search result entries in the second candidate list, based on the defined number of search result entries analyzed in the first candidate. Analyzing one or more search result entries in the second candidate list includes attempting to access respective search results entries of the defined number of search entries utilizing access credentials of the user. In a further aspect, the method further includes one or more processors generating a finalized search result list based on the determined subset of search result entries in the first candidate list and the determined subset of search result entries in the second candidate list.

DETAILED DESCRIPTION

Embodiments of the present invention allow for performing a search (e.g., an enterprise search in an enterprise environment) and generating corresponding results that take into account the respective access privilege levels of the search results. In response to receiving a search query, embodiments of the present invention operate to generate a first list of candidate search results and generate a second list of candidate search results. The second list is generated utilizing pre-filtering (the process of pre-filtering is described in further detail below). Then, embodiments of the present invention operate to perform post-filtering on a defined number (N) of results from the first candidate list and also perform post filtering on the second candidate list, based on the defined number (N) (the process of post-filtering is described in further detail below). Further, embodiments of the present invention operate to generate a finalized result list for the search query and provide the finalized result list as results (i.e., to the corresponding requesting user).

Some embodiments of the present invention recognize that many products and services employ an enterprise search function, which searches for data and documents that are managed in an enterprise. However, unlike products that operate traditional web searching, enterprise search is a product that is capable of searching for documents or files stored in different kind of content management systems and file servers at once. In such products, the search is performed on a system that stores document and files (e.g., a content management server, a file server, etc.), herein referred to as a data source server. In addition, the stored documents and files to be searched for are called search target data.

Additionally, embodiments of the present invention recognize that some data source servers set user access privileges to the stored documents and files to control the access privileges of particular users. Enterprise search products can include implementation of a function of presenting only search target data that the requesting user is allowed to access, as the returned search results. Various embodiments of the present invention can operate to utilize the processes of pre-filtering and post-filtering (described in further detail below).

Implementation of embodiments of the invention may take a variety of forms, and exemplary implementation details are discussed subsequently with reference to the Figures.

Figure 1:
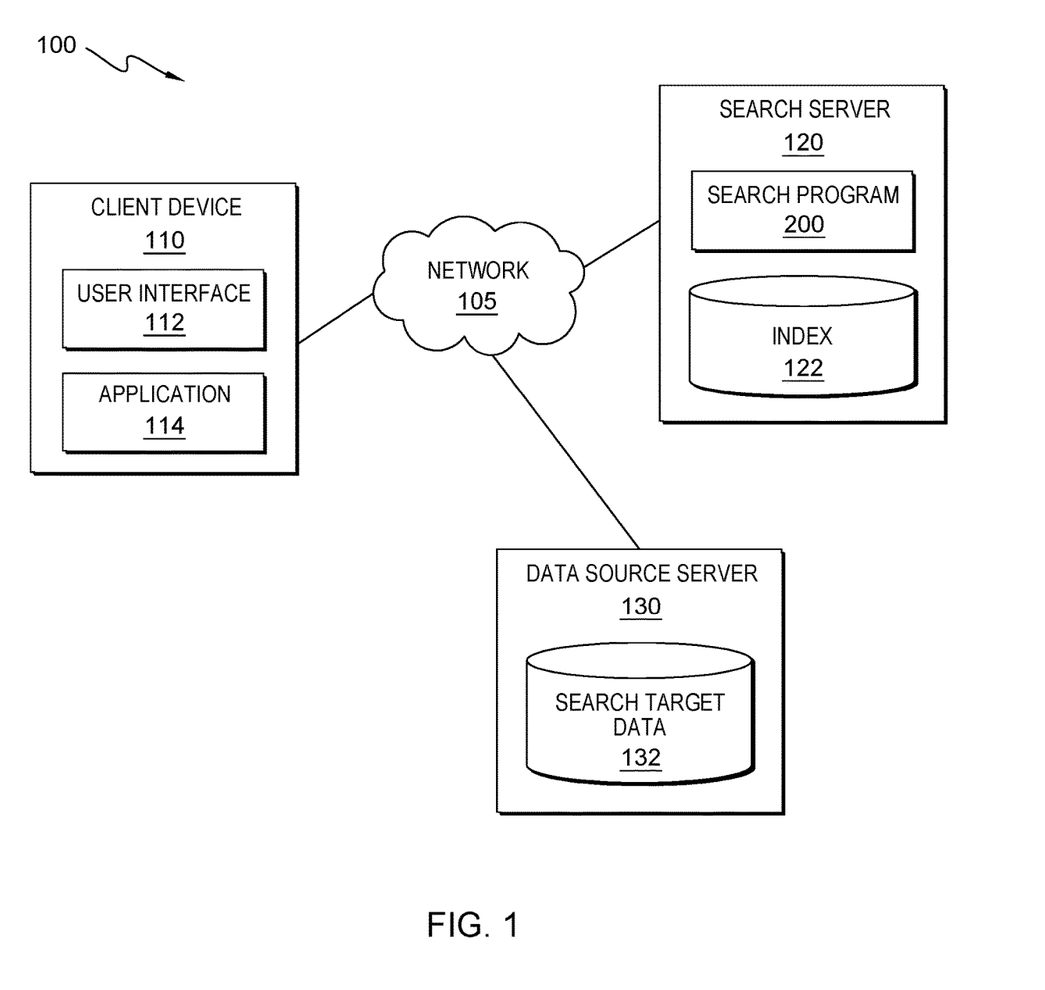
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110, search server 120, and data source server 130, all interconnected over network 105. In an example embodiment, search server 120 is representative of a computing system (e.g., one or more management servers) that facilitates searching of one or more data sources (e.g., data source server 130) by a group of users (e.g., groups of users associated with an enterprise), such as a user associated with client device 110 (and other users/devices not shown). In other embodiments, data processing environment 100 can include additional instances of computing devices (not shown) that can interface with search server 120 and data source server 130, in accordance with various embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110, search server 120, and data source server 130, in accordance with embodiments of the present invention. In various embodiments, network 105 facilitates communication among a plurality of networked computing devices (e.g., client device 110, search server 120, data source server 130, and other devices not shown), corresponding users (e.g., client device 110, etc.), and corresponding management services (e.g., search server 120, data source server 130, etc.).

In various embodiments of the present invention, client device 110 may be a workstation, personal computer, personal digital assistant, mobile phone, or any other device capable of executing computer readable program instructions, in accordance with embodiments of the present invention. In general, client device 110 are representative of any electronic device or combination of electronic devices capable of executing computer readable program instructions. Client device 110 may include components as depicted and described in further detail with respect to FIG. 4, in accordance with embodiments of the present invention.

In an example embodiment, client device 110 is a personal workstation or mobile device associated with (e.g., registered to and/or utilized by) a corresponding user that is associated with an enterprise that utilizes searching services associated with search server 120. In one example, a user of client device 110 is able to access (i.e., has access privileges for) one or more documents of associated with (e.g., managed by, etc.) an enterprise. Further, in this example, the user of client device 110 can submit search queries, which search server 120 can process to provide results that are relevant and accessible to the user of client device 110, in accordance with various embodiments of the present invention.

Client device 110 includes user interface 112 and application 114. User interface 112 provides an interface between a user of client device 110 and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 can be representative of one or more applications (e.g., an application suite) that operates on client device 110. In various example embodiments, application 114 can be an application that a user of client device 110 utilizes to search data associated with an enterprise, via search server 120. For example, application 114 is be a web browser that the user of client device 110 can access and utilize. In another example, application 114 is an enterprise-specific program and/or platform (e.g., associated with server 120) that the user of client device 110 can utilize to submit search queries on documents of an enterprise.

In various embodiments, the user of client device 110 is registered with an enterprise search platform (e.g., to search for documents on data source server 130). For example, the user completes a registration process, provides information, and authorizes the collection and analysis (i.e., opts-in) of relevant data provided by at least client device 110, by search server 120 and data source server 130. In additional aspects, the user of client device 110 has opted-in to the process of generating search results based on access control, facilitated by search server 120 (utilizing search program 200). In another example, the user of client device 110 can provide information of the access level of the user (e.g., access credentials, a validation of an access level for an enterprise, etc.).

In example embodiments, search server 120 can be a desktop computer, a computer server, or any other computer systems, known in the art. In certain embodiments, search server 120 represents computer systems utilizing clustered computers and components (e.g., database server computers, application server computers, etc.) that act as a single pool of seamless resources when accessed by elements of data processing environment 100 (e.g., client device 110 and other devices not shown). In general, search server 120 is representative of any electronic device or combination of electronic devices capable of executing computer readable program instructions. Search server 120 may include components as depicted and described in further detail with respect to FIG. 4, in accordance with embodiments of the present invention.

Search server 120 includes index 122 and search program 200. In various embodiments, search server 120 operates as a computing system that executes search queries, received from client device 110 (e.g., users associated with an enterprise), in accordance with various aspects of the present invention. In example embodiments, search server 120 utilizes search program 200 to generating search results based on access control of a requesting user, as discussed in further detail with regard to FIG. 2.

In example embodiments, index 122 can be implemented with any type of storage device, for example, persistent storage 405, which is capable of storing data that may be accessed and utilized by search server 120, such as a database server, a hard disk drive, or a flash memory. In other embodiments, index 122 can represent multiple storage devices and collections of data within search server 120.

In various embodiments, index 122 is representative of a searchable data store that search server 120 utilizes to provide results in response to search queries. In one embodiment, index 122 stores a plurality of documents of an enterprise. In another embodiment, index 122 can store portions (e.g., summaries, keywords, snippets, etc.) of documents of an enterprise. In addition, index 122 can store a link to a document at an external location (e.g., a link to a webpage, a link to an external data store, etc.). Search server 120 (utilizing index 122) can also store a text context of documents associated with an enterprise. In an example scenario, search server 120 stores a text context of Doc1 and Doc2 in index 122, including any corresponding metadata. The metadata associated with a document can include an indication of access privileges for the corresponding document (i.e., an indication of whether a user is authorized to access the document or not). For example, index 122 includes metadata that indicates that Doc1 is associated with access privileges for User1, and that Doc2 is associated with access privileges for User1 and User 2.

In example embodiments, data source server 130 can be a desktop computer, a computer server, or any other computer systems, known in the art. In certain embodiments, data source server 130 represents computer systems utilizing clustered computers and components (e.g., database server computers, application server computers, etc.) that act as a single pool of seamless resources when accessed by elements of data processing environment 100 (e.g., client device 110, search server 120, and other devices not shown). In general, data source server 130 is representative of any electronic device or combination of electronic devices capable of executing computer readable program instructions. Data source server 130 may include components as depicted and described in further detail with respect to FIG. 4, in accordance with embodiments of the present invention.

Data source server 130 includes search target data 132. In various embodiments, data source server 130 includes searchable files (e.g., documents, Portable Document Format (PDF) documents, spreadsheets, messages, etc.) and metadata corresponding to the searchable filed (e.g., access privileges, timestamps, filename, keyword tags, etc.). In example aspects, data source server 130 can store the searchable files and corresponding metadata in search target data 132. For example, data source server 130 is a system that stores documents and filed that are to be searches, such as operating a content management system or file server for an enterprise.

In example embodiments, search target data 132 can be implemented with any type of storage device, for example, persistent storage 405, which is capable of storing data that may be accessed and utilized by data source server 130 (and other authorized devices, such as search server 120 and client device 110), such as a database server, a hard disk drive, or a flash memory. In other embodiments, index 122 can represent multiple storage devices and collections of data within data source server 130.

Embodiments of the present invention recognize that some data servers utilize access privileges to stored documents and filed to control access privileges per user. For example, many enterprise search products include implementation of a function for presenting a user only the search target data that the user is allowed to access/view, based on the corresponding access privileges of the user and the respective stored documents. Various aspects of the present invention utilize techniques of pre-filtering and post-filtering for generating search results for a user, based on access privileges of potential search results to the respective user.

The process of pre-filtering includes, when retrieving target search data in response to a query from a user, utilizing access privilege data stored in a local index (e.g., in index 122 on search server 120) to determine whether the user has access to potential search results. The process of post-filtering includes, at the time of searching in response to a query from a user, creating a list of search result candidates utilizing a local index (e.g., in index 122 on search server 120). Further, post-filtering includes accessing the candidates in the list utilizing the access privileges of the requesting user, to determine whether the candidates can be presented to the user in the search result set.

In an example scenario of pre-filtering with regard to FIG. 1, in response to a user (on client device 110) performing a keyword search (e.g., utilizing application 114), search server 120 receives the search query and executes the search query utilizing information, including indications of corresponding access privileges, in index 122. For example, index 122 includes metadata that indicates that Doc1 is associated with access privileges for User1, and that Doc2 is associated with access privileges for User1 and User 2. In this example scenario, the user of client device 110 is User2, therefore search server 120 searches the contents of index 122 and determines that Doc2 includes keywords of the search query and that Doc2 authorizes access for the user of client device 110 (i.e., User2 authorization).

In an example scenario of post-filtering with regard to FIG. 1, in response to a user (on client device 110) performing a keyword search (e.g., utilizing application 114), search server 120 receives the search query and executes the search query on information stored in index 122. For example, index 122 includes metadata that indicates that Doc1 is associated with access privileges for User1, and that Doc2 is associated with access privileges for User1 and User 2. In this example scenario, search server 120 performs a keyword search (on index 122) and identifies Doc1 and Doc2. Then, for post-filtering, search server 120 utilizes access privileges to attempt to access Doc1 and Doc2 (or other manner of validating the ability for the requesting user to access the candidate search results). In this example scenario, search server 120 is able to validate user access for Doc2 but is not able to validate user access for Doc1. Accordingly, search server 120 can return Doc2 as the result in response to the query from client device 110.

The processes of pre-filtering and post-filtering can provide respective advantages and disadvantages. In the case of pre-filtering, search server 120 utilizes the access privileges in the index (e.g., index 122), which correspond to the time of creation of the index (or a time of last update). Accordingly, the search process can take just a short time to present search results to the user. However, if the access privileges for the user have changed since the creation (or update) of the index, then the access privilege change will not be reflected in the search results returned. For example, a user is granted access privileges to a data set after creation of the index. In the case of post-filtering, search server 120 can utilize the actual access privileges of the user and access the corresponding data source (e.g., data source server 130). However, as the post-filtering process involves checking/verifying potential search result data that was indicated as inaccessible at the time of the creation (or update) of the index), the process to return search results to the user can take a longer time.

Accordingly, embodiments of the present invention can operate to execute searches for user (e.g., a user of client device 110) utilizing a combination of pre-filtering and post-filtering, in accordance with various embodiments of the present invention. In various aspects, the process of search server 120 employing a combination of aspects of pre-filtering and post-filtering, through execution of search program 200, is described in further detail with regard to FIG. 2.

Figure 2:
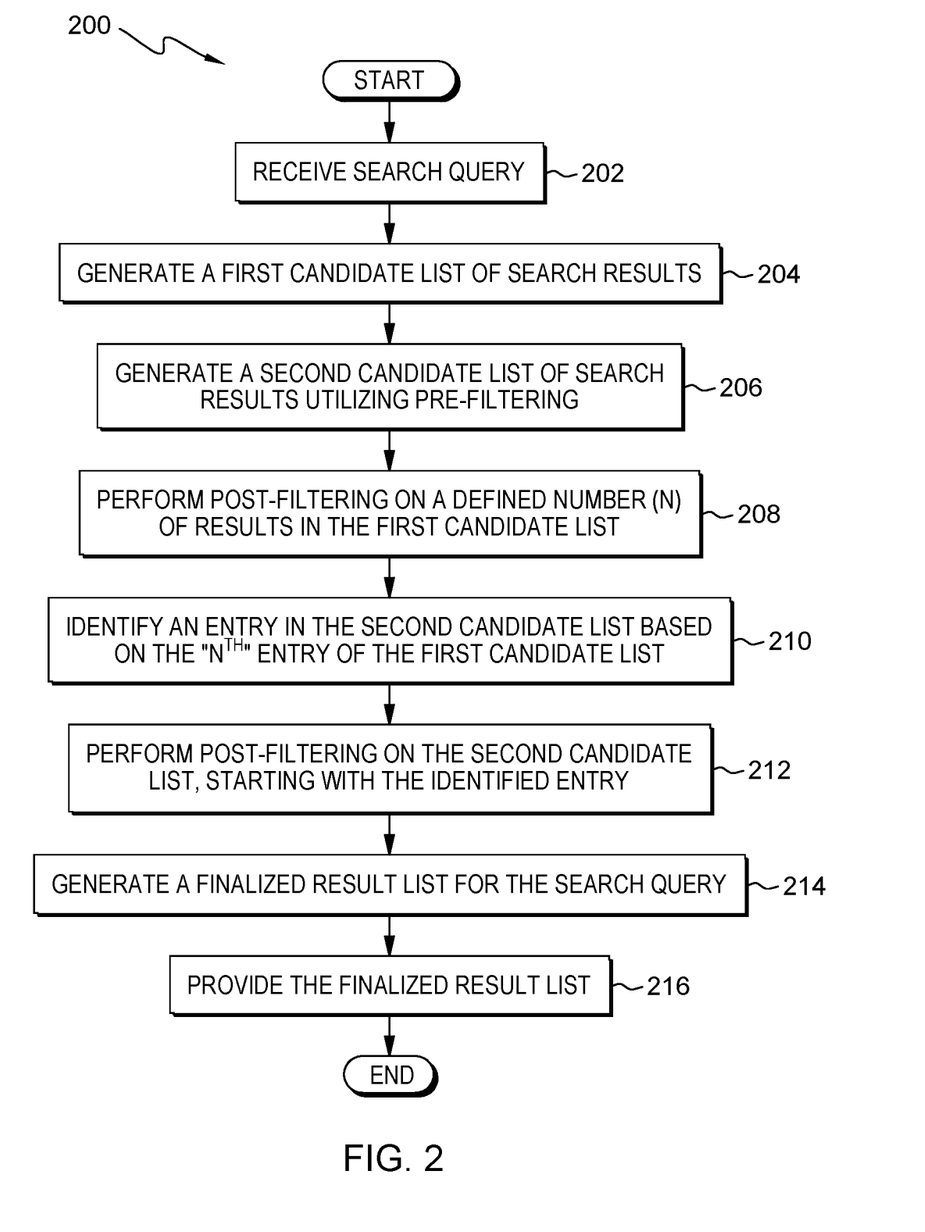
FIG. 2 is a flowchart depicting operational steps of a program for generating search results based on access control of a requesting user, in accordance with embodiments of the present invention.

FIG. 2 is a flowchart depicting operational steps of search program 200, a program for generating search results based on access control of a requesting user, in accordance with embodiments of the present invention. In one embodiment, search program 200 initiates in response to a user (e.g., a user of client device 110) initiating a search. For example, a user of client device 110 utilizes application 114 (e.g., opens/logs-in to a search function of an application) to perform an enterprise search. In another embodiment, search program 200 can operate as a background process on search server 120, waiting to receive search queries from users (e.g., users of an enterprise search platform).

In step 202, search program 200 receives a search query. In one embodiment, search program 200 receives a search query from a user of client device 110 (e.g., input into application 114 via user interface 112). In example embodiments, client device 110 is associated with a user that is associated with an enterprise that search server 120 supports. In such embodiments, client device 110 can operate to send enterprise search queries to search server 120. In an example scenario, the user of client device 110 inputs a search query that includes the term/keyword "ItemA" and client device 110 transmits the search query to search server 120 for processing.

In step 204, search program 200 generates a first candidate list of search results. In one embodiment, in response to the received search query (from step 202), search program 200 generates a first candidate list of corresponding search results. In various embodiments, search server 120 performs standard search processing to generate the first candidate list. For example, search program 200 performs a search on index 122 to generate the first candidate list. In another embodiment, search program 200 performs the search on index 122 without utilizing access privileges of the requesting user (e.g., the user of computing device 110).

Figure 3A:
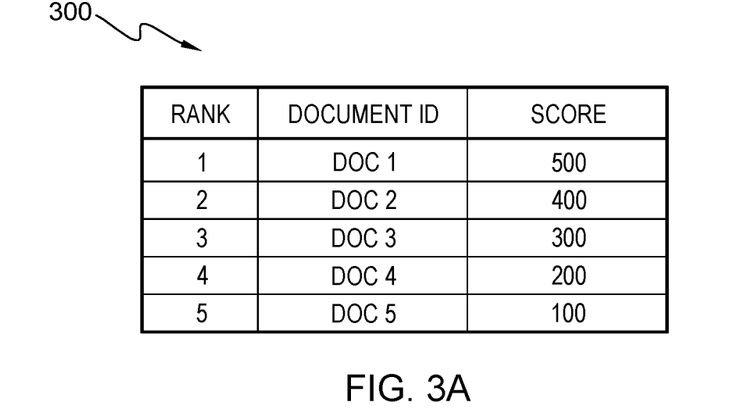
FIG. 3A depicts an example table of candidate search results, in accordance with embodiments of the present invention.

In the previously discussed example scenario, the user of client device 110 inputs a search query that includes the term/keyword "ItemA." In this example scenario, search program 200 generates the first candidate list based on searching index 122 utilizing the keyword "ItemA." For example, search program 200 generates first candidate list 300, which is depicted in FIG. 3A. First candidate list 300 includes a listing of search result items (i.e., documents listed in the Document ID column) arranged in descending order (indicated in the rank column) according to respective scores (indicated in the score column). The content of the document ID column is representative of an identifier that uniquely identifies each respective instance of search target data (e.g., Doc1, Doc2, Doc3, Doc4, and Doc5). The content of the score column is representative of a numerical scoring value (e.g., can be based on enterprise definitions) that determines the relevancy and ordering of a respective search result item, such that a higher score corresponds to a higher position (i.e., rank indicated by the rank column).

In step 206, search program 200 generates a second candidate list of search results utilizing pre-filtering. In one embodiment, in response to the received search query (from step 202), search program 200 generates a second candidate list of corresponding search results, utilizing pre-filtering techniques. The process of pre-filtering includes, when retrieving target search data in response to a query from a user, utilizing access privilege data stored in a local index (e.g., in index 122 on search server 120) to determine whether the user has access to potential search results.

Figure 3B:
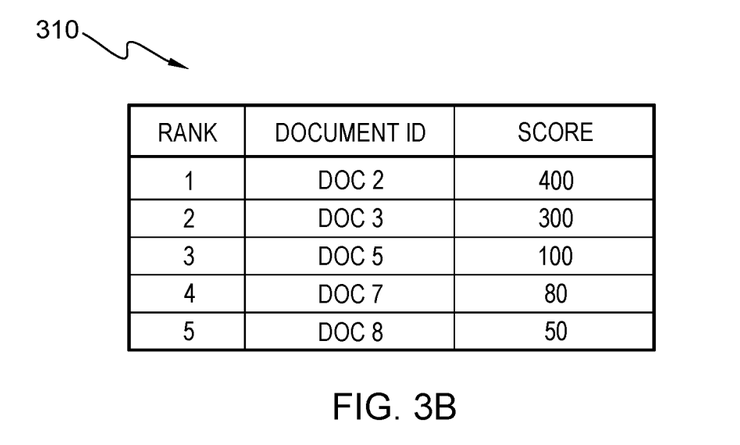
FIG. 3B depicts an example table of candidate search results, in accordance with embodiments of the present invention.

In the previously discussed example scenario, the user of client device 110 inputs a search query that includes the term/keyword "ItemA." In this example scenario, search program 200 generates the first candidate list based on searching index 122 utilizing the keyword "ItemA" and filters out search results that are not associated with metadata that indicates that the user of client device 110 has access privileges to the respective candidate search result. For example, search program 200 generates second candidate list 310, which is depicted in FIG. 3B. The columns of rank, document ID, and score in FIG. 3B represent data categories that correspond to the respective columns previously discussed with regard to FIG. 3A. In this example scenario, second candidate list 310 includes Doc2, Doc3, Doc5, Doc7, and Doc8, which are ordered candidate search results (e.g., from index 122) that take into account the access privileges of the user of client device 110, relative to respective access privilege data in index 122. In this example, second candidate list 310 does not include Doc1 and Doc4 from first candidate list 300.

In step 208, search program 200 performs post-filtering on a defined number (N) of results in the first candidate list. In one embodiment, search program 200 performs the post-filtering process on a defined number (N) of candidate search results in the first candidate list of search results (generated in step 204). The process of post-filtering includes, at the time of searching in response to a query from a user, creating a list of search result candidates utilizing a local index (e.g., in index 122 on search server 120). Further, post-filtering includes accessing the candidates in the list utilizing the access privileges of the requesting user, to determine whether the candidates can be presented to the user in the search result set. In various embodiments, search program 200 can utilize post-filtering to determine whether the requesting user has validated access to the particular instances of search results.

Embodiments of the present invention can operate to determine the value of "N" (the defined number) in one or more of a plurality of different ways. In one scenario, search program 200 utilizes a statically determined value for N. For example, search program 200 utilizes a number that corresponds to 25% of the search result entries that can be presented on one screen (e.g., when twenty results can fit, N=5). In another scenario, search program 200 utilizes a dynamically determined value for N. For example, search program 200 utilizes a score threshold for candidate search results and determines N to be the number of search result entries that are above the score threshold (e.g., when a list of candidate search results includes seven entries that are above the threshold score of 375, N=7). In another example, search program 200 can utilize a time-based threshold to dynamically determine a value for N (e.g., when search program 200 can perform post-filtering on nine results within the time-based threshold of 1 second, N=9). In an additional example, search program 200 can dynamically determine N based on a prediction of whether the candidate search result listing includes the correct result (e.g., search program 200 calculates the probability of the correctness (correct answer rate) of the result which would be resulted using pre-filtering, and if the correct answer rate is high, a small value (e.g., N=5) is chosen and if the correct answer rate is low, a larger value (e.g., N=10) is chosen).

In the previously discussed example scenario, search program 200 generates the first candidate list based on searching index 122 utilizing the keyword "ItemA." For example, search program 200 generates first candidate list 300, which is depicted in FIG. 3A. In this example scenario, search program 200 utilizes a value of N=4. Accordingly, search program 200 performs post-filtering on the first four results in first candidate list 300 (i.e., Doc1, Doc2, Doc3, and Doc4). In this example scenario, through performing the post filtering process (i.e., application/utilization of access credentials), search program 200 determines that the user of client device 110 is associated with access credentials that are capable of accessing Doc1, Doc2, and Doc3, and is not capable of accessing Doc4.

In step 210, search program 200 identifies an entry in the second candidate list based on the "$N^{th}$" entry of the first candidate list. In example embodiment, search program 200 identifies entries that are subsequent to the $N^{th}$ entry in the first candidate list, then searches for the identifies entries in the first candidate list. The $N^{th}$ entry of the first candidate list corresponds to the last item that search program 200 performed post-filtering on in step 208 (utilizing the definitions of N discussed above).

In the previously discussed example scenario, search program 200 utilizes a value of N=4 and performs post-filtering on the first five results in first candidate list 300 (i.e., Doc1, Doc2, Doc3, Doc4, and Doc5). In this scenario, search program 200 identifies the $N^{th}$ entry of first candidate list 300, which corresponds to Doc4. Then, search program 200 searches second candidate list 310 for the entry that is subsequent to Doc4 in first candidate list 300 (i.e., the $N^{th}$ entry of the first candidate list). In the depicted example, Doc5 is the entry that is subsequent to Doc 4 in first candidate list 300; and therefore, search program 200 searches for and identifies Doc5 in second candidate list 310. In an alternate aspect, if the entry that is subsequent to the $N^{th}$ entry of the first candidate list is not present in the second candidate list (e.g., filtered out via pre-filtering), then search program 200 searches the second candidate list for the second subsequent entry to the $N^{th}$ entry of the first candidate list.

In step 212, search program 200 performs post-filtering on the second candidate list, starting with the identified entry. In various embodiments, search program 200 employs the post-filtering process (described above in step 208) on candidate search result entries of the second candidate list (generated in step 206), starting with the identified entry of the second candidate list (from step 210).

In the previously discussed example scenario, search program 200 identifies Doc5 in second candidate list 310 (as the identified entry based on the $N^{th}$ entry of first candidate list 300). In this example scenario, search program 200 proceeds to perform post-filtering on second candidate list 310, starting with Doc5. Accordingly, search program 200 performs post-filtering on Doc5, Doc7, and Doc8. In this example scenario, through performing the post filtering process (i.e., application/utilization of access credentials), search program 200 determines that the user of client device 110 is associated with access credentials that are capable of accessing Doc5, Doc7, and Doc8.

In step 214, search program 200 generates a finalized result list for the search query. In one embodiment, search program 200 generates a finalized result list based on the post-filtering processes performed above in step 208 and step 212. In various embodiments, search program 200 generates the finalized result list to include search results that the user of client device 110 is able to access, based on the implantation of post-filtering leveraging the access privileges of the user.

Figure 3C:
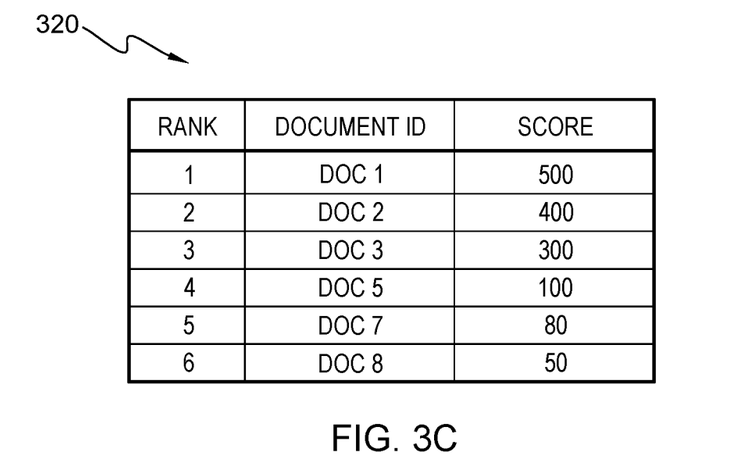
FIG. 3C depicts an example table of candidate search results, in accordance with embodiments of the present invention.

In the previously discussed example scenario, search program 200 performed post filtering on entries of first candidate list 300 (Doc1, Doc2, Doc3, and Doc4) and second candidate list 310 (Doc5, Doc7, and Doc8). In this example scenario, search program 200 determines, through post-filtering verification, that the user of client device 110 is associated with access credentials that are capable of accessing Doc1, Doc2, and Doc3 from first candidate list 300, and Doc5, Doc7, and Doc8 from second candidate list 310. Accordingly, search program 200 generates result list 320, which includes Doc1, Doc2, Doc3, Doc5, Doc7, and Doc8 arranged in descending order (indicated in the rank column) according to respective scores (indicated in the score column).

Embodiments of the present invention operate to provide advantages over previous enterprise search technologies. For example, for search target data that is near the top position of search results (e.g., a high corresponding score), embodiments of the present invention can operate to consult the actual access privileges of the user. Then for search target data in a lower position of the search results (e.g., based on score), embodiments of the present invention can operate to reduce delay in presenting search results, due performing pre-filtering processes. Further, embodiments of the present invention provide the advantage that the top results (i.e., potentially most relevant) ate not omitted or ignored due to outdated or inaccurate access credential information (in the index). In the previously discussed example scenario, embodiments of the present invention operate to identify and include Doc1 as a search result, when Doc1 can be initially omitted if only utilizing pre-filtering.

In step 216, searching program 200 provides the finalized result list. In one embodiment, searching program 200 provides the finalized result list (generated in step 214) to the user that submitted the search query (in step 202). In various embodiments, search program 200 provides the finalized result list to search server 120, for search server 120 to utilize to present enterprise search results to client device 110.

Embodiments of the present invention recognize that in a conventional case of only performing pre-filtering, the corresponding search result would correspond to the result depicted in the second candidate list 310 (FIG. 3B). In such examples, even if the access privileges for Doc1 have been changed, Doc1 would not be presented as a search result, even though Doc1 corresponds to a high score. A similar result will occur when performing pre-filtering and then post-filtering. Further, in the conventional case of only post-filtering being performed, the search server would perform post-filtering on each result entry in first candidate list 300, which results in the search processing taking the extra processing power and bandwidth to process Doc4, which has a low corresponding score, and is indicated (via metadata in the index) as not being accessible to the requesting user.

Accordingly, embodiments of the present invention operate to utilize a combination of pre-filtering and post-filtering. As a result, the search results with the highest corresponding score are correctly presented, without potentially being overlooked. In addition, by performing pre-filtering in advance, the search can execute in less time than performing post-filtering on all of the candidate search results.

Figure 4:
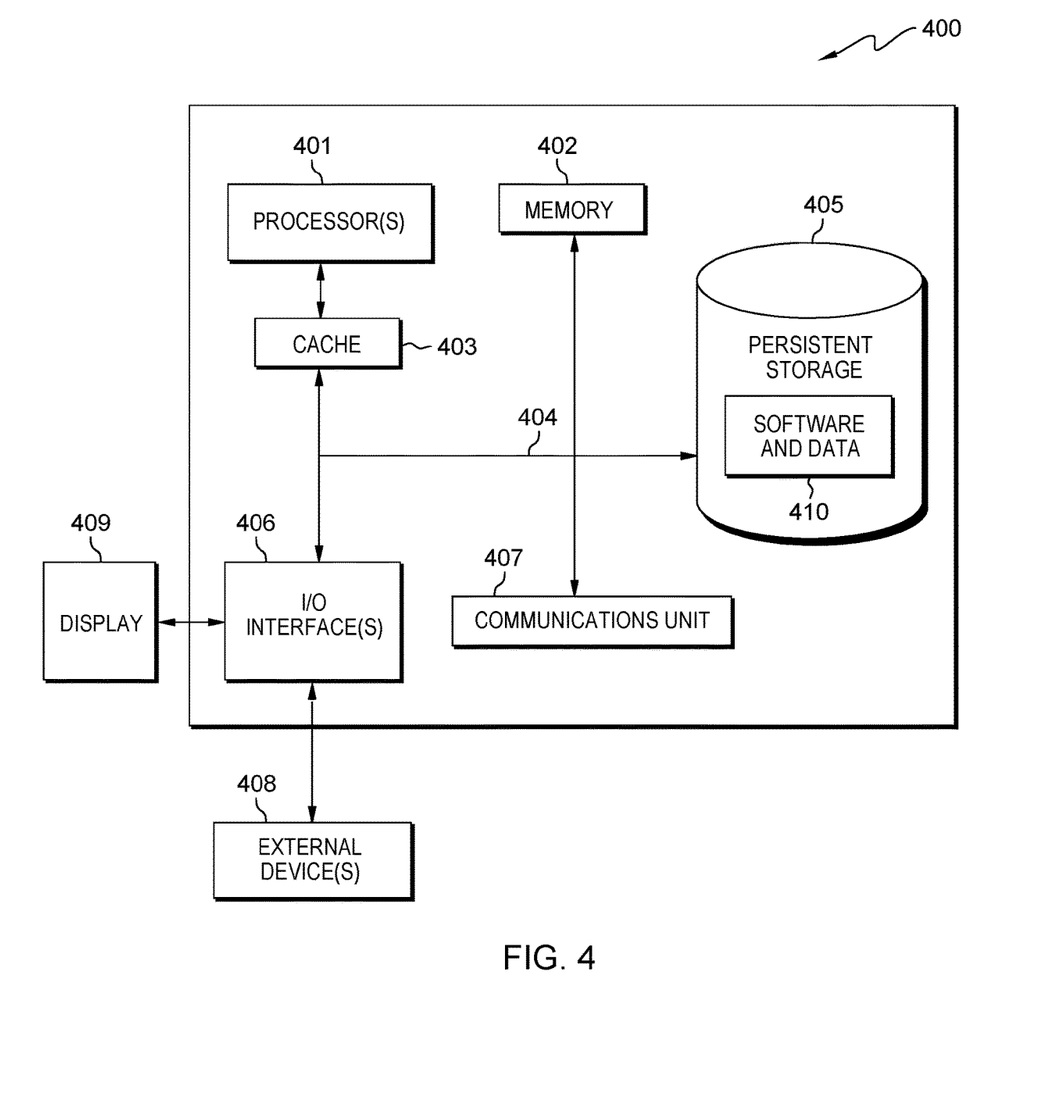
FIG. 4 depicts a block diagram of components of a computing system representative of the client device, search server, and data source server of FIG. 1, in accordance with an embodiment of the present invention.

FIG. 4 depicts computer system 400, which is representative of client device 110, search server 120, data source server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 110, software and data 410 includes user interface 112 and application 114. With respect to search server 120, software and data 410 includes search program 200 and index 122. With respect to data source server 130, software and data 410 includes search target data 132.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:

receiving, by one or more processors, by a search server of an enterprise, a search query from a client device of a user in the enterprise;

initiating, by one or more processors, a search of target data in one or more storage locations of one or more data storage servers in the enterprise;

generating, by one or more processors, a first candidate list of search results based on the received search query;

determining, by one or more processors, that the user of the client device has user access privileges to one or more of the search results in the first candidate list based on indexed user privilege data stored on the search server;

generating, by one or more processors, a second candidate list of the one or more search results in the first candidate with user access privileges based on the indexed user privilege data,. wherein the second candidate list is ranked from a highest relevant search result to a lowest relevant search result;

executing, by one or more computer processors, an attempt to access each of a pre-determined number of search result candidates from the second candidate list; and presenting, by one or more processors, a final search query result including the pre-determined number of the search result candidates of the second candidate list the user of the client device can access.

2. The method of claim 1, wherein the search query is a key word.

3. The method of claim 2, wherein the statically determined value for the pre-determined number of search result candidates is one of a number of search result candidates that can be presented on the user interface or a percentage of the number of search result candidates that can be presented on the user interface.

4. The method of claim 1, wherein the pre-determined number of search result candidates from the second candidate list is a statically determined value for the pre-determined number of search result candidates.

5. The method of claim 1, wherein the pre-determined number of search result candidates from the second candidate list is determined using a time-based search threshold to dynamically determine a value for the pre-determined number of search result candidates.

6. The method of claim 1, wherein generating the second candidate list of the one or more search results in the first candidate with user access privileges based on the indexed user privilege data pre-filters the first candidate list.

7. The method of claim 1, wherein executing the attempt to access each of the pre-determined number of search result candidates from the second candidate list is a post-filtering process for the pre-determined number of search result candidates from the second candidate list.

8. The method of claim 1, wherein presenting the final search query results further comprises:

determining, by one or more processors, that the user of the client device has user access privileges to each of the search result candidates in the first candidate list by searching metadata in one or local indexes stored in the search server in the pre-filtering;

verifying, by one or more processors, in the post-filtering process, a user access for the user of the client device to one or more of the pre-determined number of search candidates from the second candidate list; and displaying, by one or more processors, the one or more of the pre-determined number of search candidates from the second candidate list the user of the client device has user access privileges for.

9. The method of claim 8, wherein the final search query results include each of the pre-determined number of search candidates from the second candidate list that the user of the client device has user access privileges to in the data server.

10. A computer program product comprising:

one or more computer readable storage media and program instructions stored on the one or more computer readable storage media, the program instructions executable by a processor, the program instructions comprising instructions for:

receiving, by one or more processors, by a search server of an enterprise, a search query from a client device of a user in the enterprise;

initiating, by one or more processors, a search of target data in one or more storage locations of one or more data storage servers in the enterprise;

generating, by one or more processors, a first candidate list of search results based on the received search query;

determining, by one or more processors, that the user of the client device has user access privileges to one or more of the search results in the first candidate list based on indexed user privilege data stored on the search server;

generating, by one or more processors, a second candidate list of the one or more search results in the first candidate list with user access privileges, wherein the second candidate list is ranked from a highest relevant search result to a lowest relevant search result executing, by one or more computer processors, an attempt to access each of a pre-determined number of search result candidates from the second candidate list; and presenting, by one or more processors, a final search query result including the pre-determined number of the search result candidates from the second candidate list the user of the client device can access.

11. The computer programming product of claim 10, wherein the pre-determined number of search result candidates from the second candidate list is a statically determined value for the pre-determined number of search result candidates.

12. The computer programming product of claim 10, wherein the pre-determined number of search result candidates from the second candidate list is determined using a time-based search threshold to dynamically determine a value for the pre-determined number of search result candidates.

13. The computer programming product of claim 10, wherein generating the second candidate list of the one or more search results in the first candidate with user access privileges based on the indexed user privilege data pre-filters the first candidate list.

14. The computer programming product of claim 10, wherein executing the attempt to access each of the pre-determined number of search result candidates from the second candidate list is a post-filtering process of the pre-determined number of search result candidates from the second candidate list.

15. The computer programming product of claim 10, wherein presenting the final search query results, further comprises:

determining, by one or more processors, that the user of the client device has user access privileges to each of the search result candidates in the first candidate list by searching metadata in one or local indexes stored in the search server in the pre-filtering;

verifying, by one or more processors, in the post-filtering process, a user access for the user of the client device to one or more of the pre-determined number of search candidates from the second candidate list; and displaying, by one or more processors, the one or more of the pre-determined number of search candidates from the second candidate list the user of the client device has user access privileges to.

16. The computer programming product of claim 10, wherein the final search query results include each of the pre-determined number of search candidates that the user of the client device has user access privileges to in the data server.

17. A computer system comprising:
one or more computer processors;
one or more computer readable storage media; and
program instructions stored on the one or more computer readable storage media for execution by at least one of the one or more processors, the program instructions comprising instructions to perform:
receiving, by one or more processors, by a search server of an enterprise, a search query from a client device of a user in the enterprise;
initiating, by one or more processors, a search of target data in one or more storage locations of one or more data storage servers in the enterprise;
generating, by one or more processors, a first candidate list of search results based on the received search query;
determining, by one or more processors, that the user of the client device has user access privileges to one or more of the search results in the first candidate list based on indexed user privilege data stored on the search server;
generating, by one or more processors, a second candidate list of the one or more search results in the first candidate list with user access privileges, wherein the second candidate list is ranked from a highest relevant search result to a lowest relevant search result
executing, by one or more computer processors, an attempt to access each of a pre-determined number of search result candidates from the second candidate list; and presenting, by one or more processors, a final search query result including the pre-determined number of the search result candidates from the second candidate list the user of the client device can access.

18. The computer system of claim 17, wherein the pre-determined number of search result candidates from the second candidate list is determined using a time-based search threshold to dynamically determine a value for the pre-determined number of search result candidates.

19. The computer system of claim 17, wherein presenting the final search query results further comprises:
determining, by one or more processors, that the user of the client device has user access privileges to each of the search result candidates in the first candidate list by searching metadata in one or local indexes stored in the search server in the pre-filtering;

verifying, by one or more processors, in the post-filtering process, a user access for the user of the client device to one or more of the pre-determined number of search candidates from the second candidate list; and displaying, by one or more processors, the one or more of the pre-determined number of search candidates from the second candidate list the user of the client device has user access privileges for.

20. The computer system of claim 17, wherein the final search query results include each of the pre-determined number of search candidates that the user of the client device has user access privileges to in the data server.

* * * * *